June 7, 1960 P. H. HOFFMAN 2,939,509
PLASTIC CORRUGATING PROCESS AND MACHINE
Filed Nov. 20, 1952 4 Sheets-Sheet 2
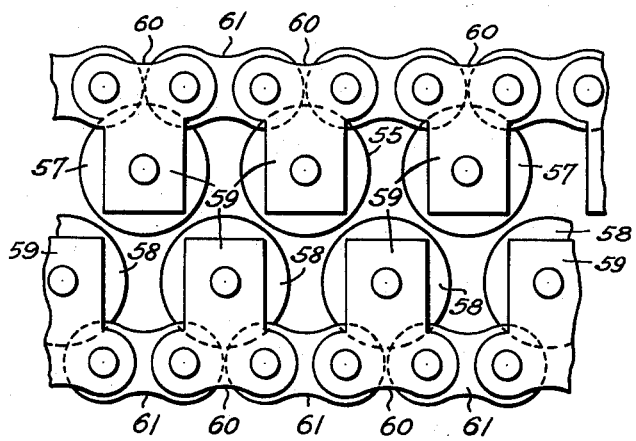
Fig. 3.
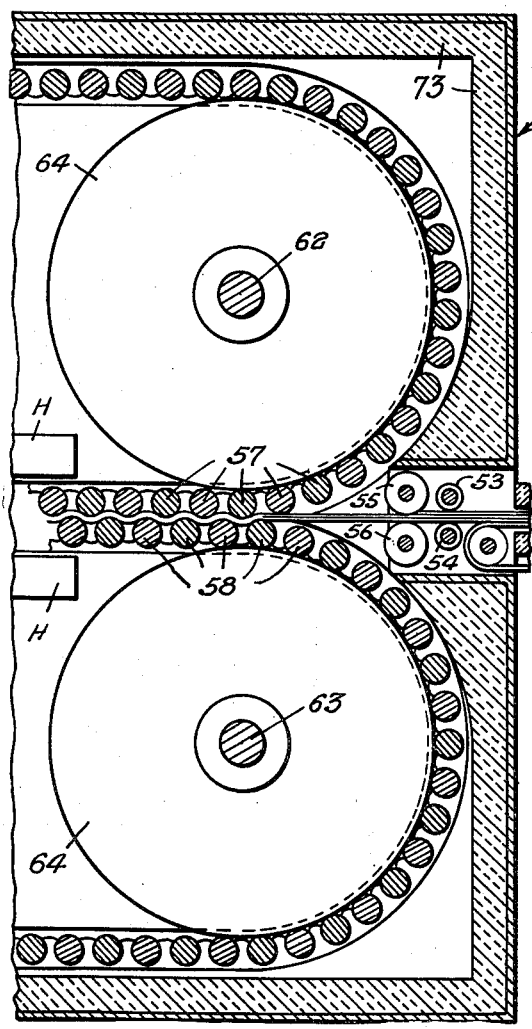
Fig. 2.
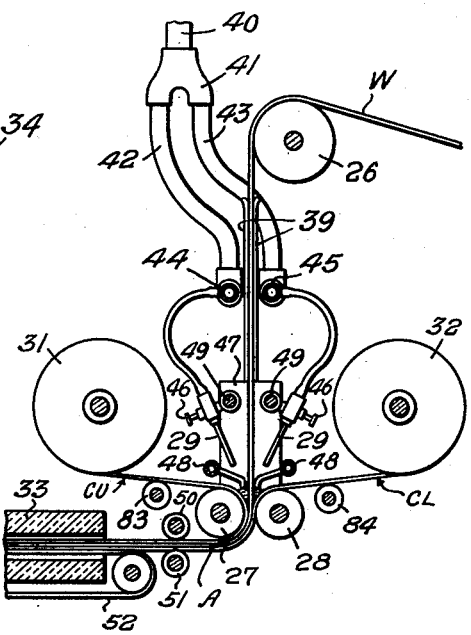
INVENTOR
Paul H. Hoffman
BY
ATTORNEY

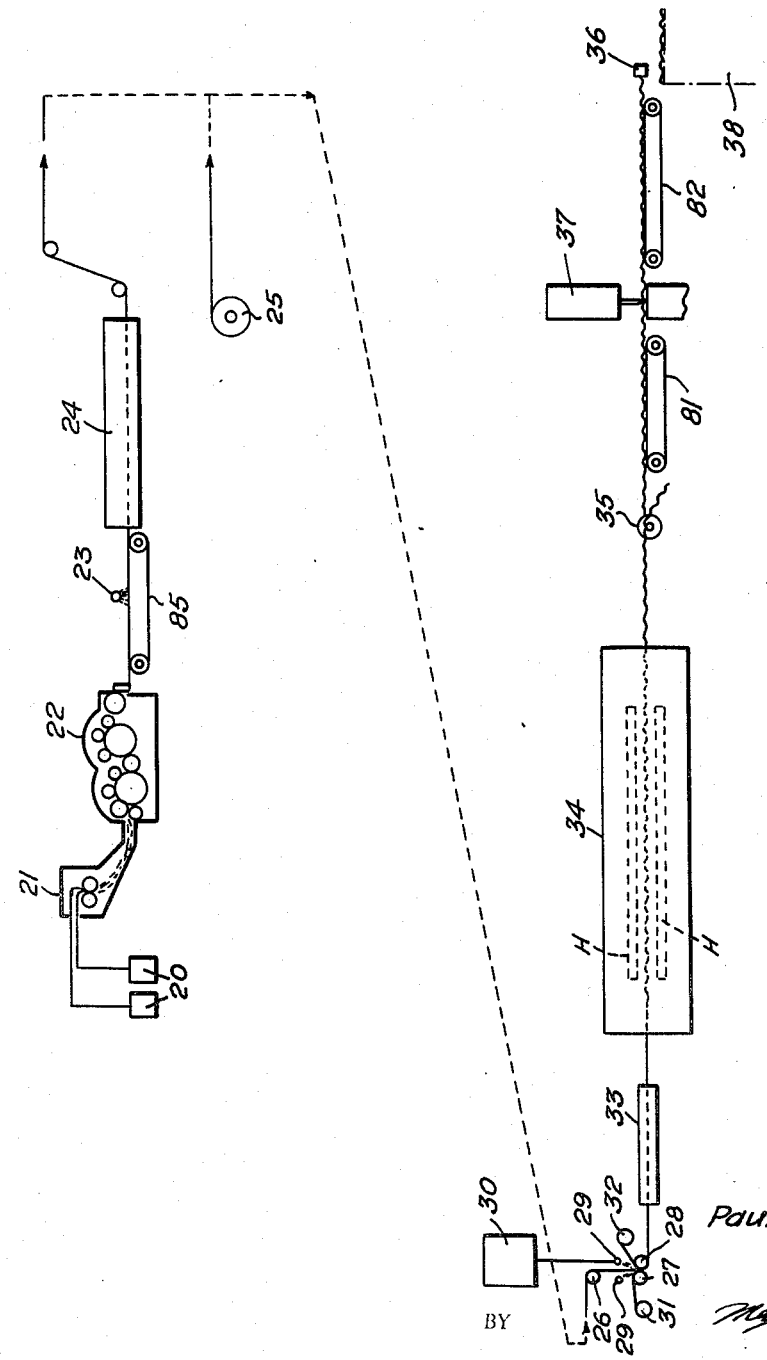

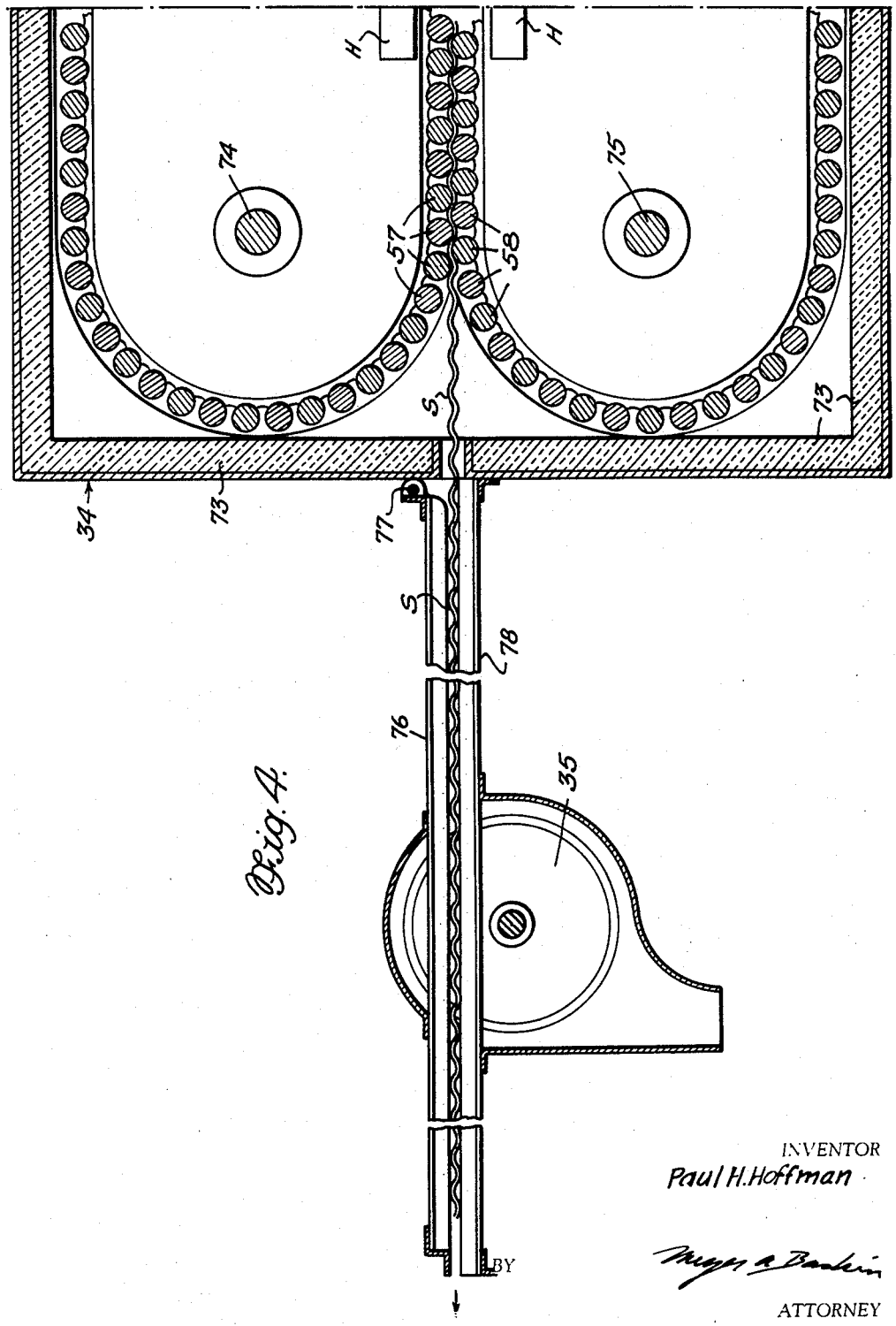

June 7, 1960    P. H. HOFFMAN    2,939,509
PLASTIC CORRUGATING PROCESS AND MACHINE
Filed Nov. 20, 1952    4 Sheets-Sheet 4

INVENTOR
Paul H. Hoffman
BY
ATTORNEY

United States Patent Office 2,939,509
Patented June 7, 1960

2,939,509

PLASTIC CORRUGATING PROCESS AND MACHINE

Paul H. Hoffman, Miami, Fla., assignor, by mesne assignments, to Fiber Glass Plastic, Inc., Miami, Fla., a corporation of Florida Filed Nov. 20, 1952, Ser. No. 321,667

10 Claims. (Cl. 154—30)

This invention relates to the manufacture of molded laminated articles of reinforced resins and more particularly to the continuous manufacture of fiber glass reinforced polyester resin corrugated sheets.

Prior to the instant invention, polyester resin laminates have been laid up in the manner of phenolic reinforced laminates, that is to say, the individual reinforcing sheets have been treated with the resin and then a series of the treated sheets are laid up as in the manner of pages of a book are laid one upon the other and then the laid-up assembly is inserted between the platens of a press wherein the assembly is subjected to heat and pressure whereupon the platens are moved apart from each other and the compressed and cured laminate is removed all in accordance with the well-known intermittent compression molding or laminating process. This procedure is relatively time-consuming and costly as well as wasteful of material and it is well known that reinforced polyester sheets made by these prior processes are sold by the square foot and are relatively expensive.

It is an object of the instant invention to provide a novel process for the continuous manufacture of reinforced molded resin.

It is another object of the invention to teach a novel apparatus for the continuous manufacture of reinforced molded resin.

It is a further object of the invention to provide a novel process for the continuous manufacture of fiber glass reinforced polyester resin corrugated sheets.

It is a further object of the invention to provide a novel apparatus for the continuous manufacture of fiber glass reinforced polyester resin corrugated sheets.

Other objects and the nature and advantages of the instant invention will be apparent from the following description taken in conjunction with the accompanying drawings, wherein:

Figure 1 is a schematic flow diagram showing the flow of material through the apparatus and showing the various steps of the process of the invention.

Fig. 2 is a fragmentary view partly in vertical section and partly in elevation of a portion of the apparatus illustrating the feeding of the material through portions of the apparatus.

Fig. 3 is an enlarged fragmentary view in elevation of the chain link forming roll assembly.

Fig. 4 is a fragmentary view partly in section and partly in elevation showing the egress of the material from the forming roll chamber and also showing one edge trimming saw.

Figure 5:
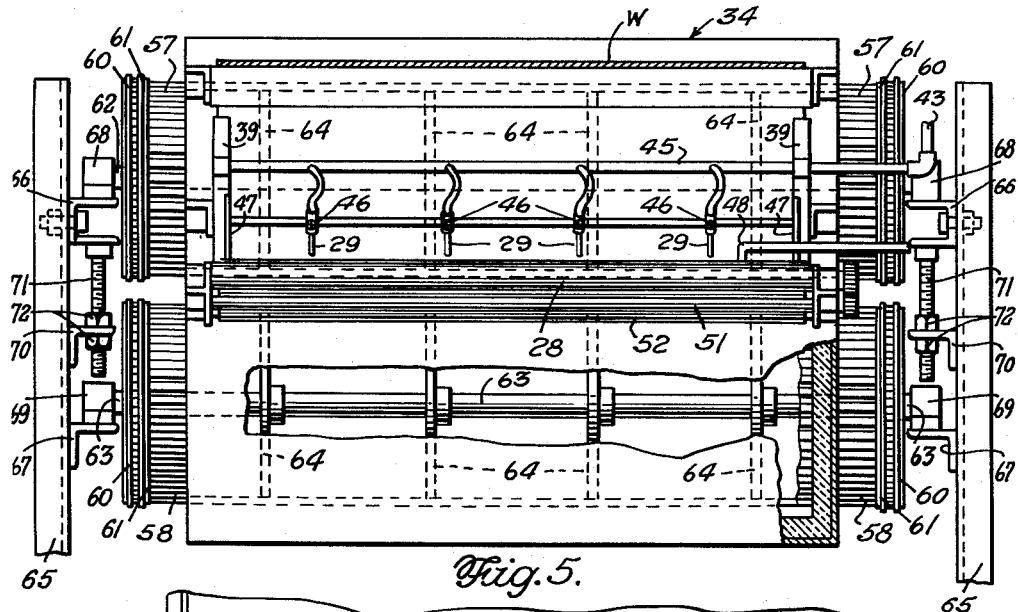
Fig. 5 is a fragmentary view partly in elevation with parts broken away and partly in section showing a portion of the frame assembly, the adjustable mounting for the upper forming roll chain assembly and other parts of the apparatus.

Referring to Figure 1, the reinforcing fiber in the form of tow or roving or other suitable form is fed from the containers 20, or from a suitable available source of fibrous material to the staple chopper 21 where the fibrous material is cut to size such as may be suitably handled by a garnetting machine 22 of any well known or approved type which assemblies the fibers into a felt-like web of material. After the relatively weak garnetted web leaves the garnetting machine 22, it is treated with a relatively small amount of resin, such as polyester resin, furfurols, amines and formaldehydes either in liquid or powder form, which may be sprayed from the nozzle 23 or otherwise applied and then is passed through an oven 24 to preliminarily set the treated web thereby increasing its strength somewhat so as to prepare it for the further treatment to be described. The conveyor 85 which supports the web beneath the nozzle 23 is preferably made of a foraminous or screen type material so that the binder emerging from the nozzle 23 may be either sprayed or blown through the webbing or matting. When the staple cutter and garnetting machine are not in operation, or alternatively, there is provided a roll 25 of fiber glass web or matting or felt which has already been treated and cured with a small amount of resin. The web passing from the curing oven 24, or the web from the roll 25, is then fed continuously to the main impregnating area and over the guide roller 26 between the rollers 27 and 28 which positions the web so as to receive a predetermined amount of polyester resins from the nozzles 29 which are fed from the polyester resin reservoir 30. Webs of inert material such as cellophane are unrolled from rolls 31 and 32 and pass between the rollers 27 and 28 and overlap each major face of the fiber glass web so that the polyester resin from the nozzles 29 will be held in reservoir-like fashion between the two cellophane webs and about the fiber glass web being impregnated. The impregnated web, covered on each side by the cellophane webs, leaves the rollers 27 and 28 and is passed through the preheating oven 33 wherein the temperature of the preliminary assembly passing therethrough is raised to a pre-gell state which may be within the range of 150° F. to 200° F. depending upon the particular resin utilized and its characteristics. This warming up of the resin lowers its viscosity and assures a uniform impregnation of the reinforcing fiber. The preheated preliminary assembly is then fed to and through oven 34 which has previously been heated to an interior temperature of about 250° F. wherein the preliminary assembly is given its final shape in both transverse and longitudinal section and in a continuous manner. The molded web continuously leaving the oven 34 then passes by the edge trimmers 35 so that the laminated product is provided with smooth side margins. After the finished end of the web contacts the micro switch 36, the transverse cutter 37 cuts the already side trimmed molded product to length and the finished sheet falls to the stack of finished sheets 38. Thereafter, and continuously as the finished end of the molded and side trimmed product contacts the micro switch 36, the transverse cutter 37 operates as already described. It will be understood that the micro switch 36 is of the trigger type which rotates it out of the way to permit delivery of the cut sheet to stack 38. The conveyor 81, located immediately after the edge trimmers 35, is driven from a power take-off associated wtih the drive (not shown) for the conveyor located within the oven 34 in order that the material passing through the oven 34 and the material as it is carried by the conveyor 81 will travel at the same speed so as to avoid stretching or buckling of the material. The conveyor 82, located after the tranverse cutter or shear 37 travels at a somewhat relatively greater speed in order to quickly remove the material after it has been cut off by the shear 37. Thus it will be understood that the apparatus starting with fiber reinforcing material either in the form of individual fibers or roving or tow, or in any other suitable form, or alternatively in the form of a matting, is continuously impregnated with polyester resin and continuously formed into molded trimmed sheets. While the apparatus and process have thus far been described in connection with the molding of a web cut into sheets of predetermined size, it is to be understood that a continuous web of any length can be formed and also that relatively small sheets such as tiles can also be thus formed.

Referring to Figures 2 and 3, the web W of fiber glass matting which may be preliminary sized with a small amount of resin, as has already been described, is passed over the guide roller 26 and between the guide plates 39. Simultaneously, the polyester resin from the reservoir 30 is pumped through the conduit 40, through the branched connector 41 and then through the conduits 42 and 43 to the manifolds 44 and 45 which feed the individual nozzles 29 which are provided with individual adjustment valves 46. The cellophane web CU is passed from the roll of cellophane 31 over the film expander 83 and over the roller 27 and adjacent one face of the web W while the web of cellophane CL from the roll 32 is passed over the film expander 84 and over the roll 28 and adjacent the opposite face of the web W in a manner such that the upper sides of the web CU and the web CL and the pair of puddle guides 47, located immediately adjacent the side edges of the moving web W, and those portions of the web CU and CL which are adjacent the upper inner quadrants of the metering rollers 27 and 28, form a reservoir or puddle of polyester impregnating resin. The film expanders 83 and 84 serve to expand the cellophane before it comes in contact with metering rolls 27 and 28, said film expanders comprising a rubber tube mounted on a shaft which can be adjusted to the desired angularity with respect to the longitudinal path of said webs. The position of the metering roll 27 is adjustable with respect to the metering roll 28 so that the thickness of the sandwich of cellophane film and impregnated fiber may be adjusted whereby more or less resin is utilized to impregnate the reinforcing fiber or webbing and the thickness of the final corrugated sheet is adjusted. The level control suction nozzles 48 serve to remove any excess polyester resin if for any reason the level of the reservoir or puddle rises above the intake orifices of the suction nozzles 48. Any excess polyester resin removed from the reservoir or puddle may be returned to the reservoir 30 or otherwise disposed of by means not shown. The lower ends of the pair of puddle guides 47 may be shaped to fit the two rollers 27 and 28 or otherwise formed to effectively contain the ends of the puddle or reservoir. The adjusting valves 46 are adjusted to feed the desired amount of reinforcing polyester resin to the impregnating puddle and if there is any excess this may be removed by the suction nozzles 48. The polyester resin feed nozzles 29 are adjustably mounted on rods 49 and the ends of the rods 49 may be secured to the puddle guides 47 whereby the nozzles 29 meter the impregnating polyester resin to the reservoir or puddle in the impregnating area, the rolls 27 and 28 meter the movement of the preliminary formed laminate assembly A through the rubber stretcher rolls 50 and 51 set at a slight angle to the path of travel of said assembly which serve to stretch the cellophane transversely of the moving assembly A and guide the assembly in a neat fashion through the pre-heating oven 33 which raises the temperature of the assembly A to a pre-gell state which may correspond to a temperature within a range of 150° F.–200° F. depending upon the particular resin utilized and its characteristics. The assembly A is supported in its travel through the oven 33 by the conveyor 52 which serves to feed the preheated assembly through the second pair of stretcher rolls 53 and 54 to the second pair of metering rolls 55 and 56 which serve to feed the preheated assembly through the oven 34 wherein are located the heating elements H, see Figs. 1, 2 and 4, and between the upper forming rolls 57 and the lower forming rolls 58. These forming rolls are each supported in individual journals 59 which are formed integral with links 60 which, together with alternate links 61, form continuous chains and a series of flexibly mounted journals for rotatably supporting the upper forming rolls 57 and the lower forming rolls 58. While the forming rolls 57 and 58 have been illustrated as being cylindrical they may take other shapes such as, for example, they may have sections corresponding to a square or a hexagon in order that the shape of the corrugation may be varied.

The chains, formed of links 60 and 61, are positively driven by gear wheels supported on the shafts 62 and 63 upon which shafts are mounted the reinforcing discs 64 which serve to maintain the position of the forming rolls 57 and 58 against deflection during the initial molding or forming or corrugating step of the preheated assembly A.

Referring to Figure 5, the vertical frame members 65 slidably support the upper brackets 66 and fixedly support the lower brackets 67. Secured to the upper brackets 66 are the journals 68 in which the shaft 62 is rotatably mounted. The lower brackets 67 support the journals 69 in which the shaft 63 is rotatably mounted. The frame members 65 also fixedly support the intermediate brackets 70 through which the adjusting screws 71 pass. By manipulating the adjusting nuts 72, the position of the shaft 62 may be raised or lowered with respect to the position of the shaft 63 so that the forming rolls 57 and 58 may be moved further apart or closer together depending upon the final thickness of sheet to be produced.

The shafts 74 and 75 are not only mounted for adjustment vertically, but they are also mounted for adjustment horizontally and in a direction of the movement of material so that in the event of any elongation of the chain link assembly the corresponding horizontal adjustment of the shafts 74 and 75 may be made to take care of such elongation by any well known or approved means. This horizontal adjustment also facilitates the removal of the conveyor assembly within the oven 34 when it is desired to change the forming members 57 and 58 as when different shapes of corrugation are desired.

The exterior walls of the oven 34 may be made of metal lined on the inside with a layer of insulation 73. It is to be noted that the chain made of links 60 and 61 and the journals 59 are all located outside of the insulated oven 34 so as to minimize contraction and expansion of these chains and in order that the product produced may be more uniform.

It is to be understood that the shafts 74 and 75, see Fig. 4, are mounted in adjustable pillow blocks in a similar manner to the mountings for the shafts 62 and 63 the latter being rigidly mounted so that when the shafts 62 and 63 are set further apart or closer together, the shafts 74 and 75 may be simultaneously moved or adjusted.

Figure 6:
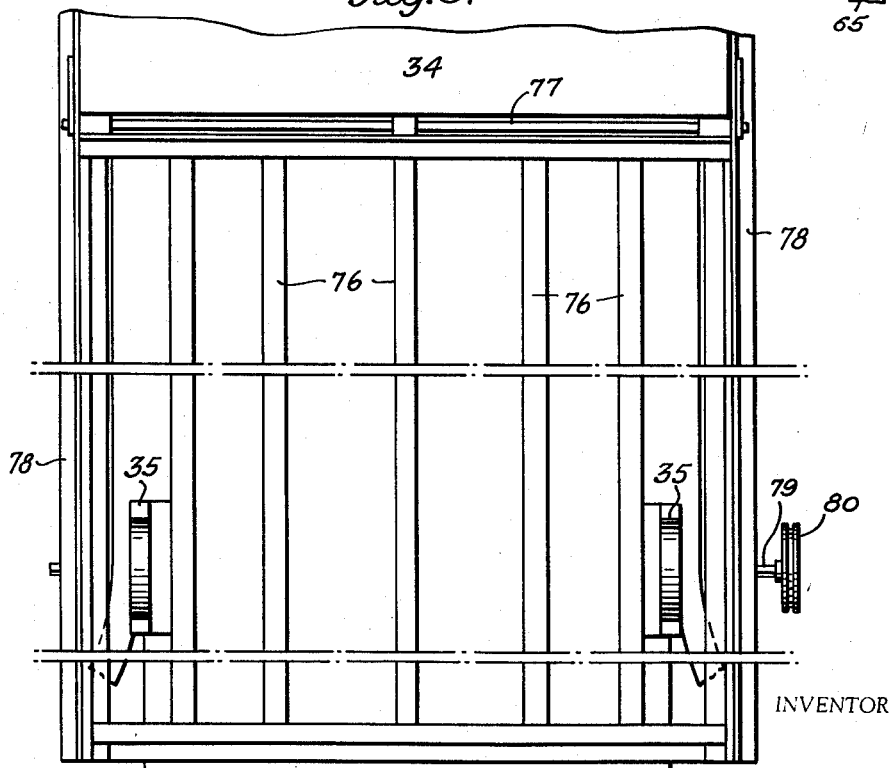
Fig. 6 is a fragmentary plan view of that portion of the apparatus shown in Fig. 4.

In Fig. 4, the formed or molded or corrugated sheet S is shown emerging from the oven 34 and passing between the slat-like cover 76 which is pivotally secured to the oven 34 by the hinge 77, as shown in Figs. 4 and 6, and the table 78 in order that the moving sheet S may be guided and passed through the trimmer saws 35 which extend through the table 78 and through the slat-like cover 76 whereby the moving sheet S is trimmed at the sides as shown in Fig. 6. The trimmer saws 35 are mounted on the shaft 79 on which is mounted the pulley 80 which is adapted to receive a belt driven by a pulley on the motor, not shown.

The speed of the driven adjustable metering rolls 27 and 28 in relation to the forming conveyor rolls 57 and 58 is variable and adjustable as by a variable speed transmission of any well known or approved type (not shown). By adjusting the speed and feed relationship of the rollers 27 and 28 to conveyor rolls 57 and 58 the height or depth of the corrugation is determined, since the material must go into the forming rollers at a faster lineal rate than it emerges to compensate for the material used in the corrugation.

It has been found in practice desirable in some instances to keep the cellophane sheets on the top and bottom of the cured formed corrugated sheet until it is ready for use in the field whereupon it may be stripped off the product and the cellophane sheets serve as a protection for the polyester formed article in shipping and handling. In other instances it has been found desirable to remove the cellophane sheet from the finished product prior to shipping to the field and in such cases the cellophane sheet may be removed in roll form prior to the trimming operation by the saws 35 or subsequent to the trimming operation. In the latter cases, the wind-up rolls for the cellophane sheet may be located either before or after the trimming saws 35 and the cellophane sheet is started upon the cellophane wind-up rolls and the automatic and continuous removal of the cellophane takes place. Accordingly, it will be understood that it is contemplated that the cellophane sheets may be removed prior to the cutting of the continuously formed sheet.

The edge trimming saws 35 may be moved axially on the shaft 79 so that the finished sheet S may be varied as to width. Additional cutting wheels may also be mounted on the shaft 79 so that a plurality of narrow sheets may be simultaneously formed.

It is also to be understood that the reinforced polyester formed sheet may be colored and that the coloring material may be added to the polyester resin and be present in the puddle or reservoir already described.

The preheating oven 33 may be heated electrically or by any other suitable means (not shown) but the temperature to be maintained is relatively mild and a relatively small amount of energy is required for this preliminary heating step. It has further been found in practice that the reaction which takes place as the assembly is formed, after the preliminary heating step has been effected, is exothermic and so that in the oven 34 no additional heating is required when the inner walls of the oven 34 are insulated. It has further been found in practice that 2" of fiber glass insulation will serve to maintain the heat of reaction so as to effect complete curing within the oven 34 without the supply of any heat from any external source, though the oven is provided with the heating elements H which are utilized during the initial or starting period.

The utilization of the cellophane webs in conjunction with the puddle guides and the metering rolls 27 and 28 serve to form the impregnating puddle the level of which is controlled by the adjustable resin feed nozzles and the suction nozzles so as to control the impregnation in coordination with the movement of the sheet as it is formed and the thickness of the sheet may be accurately controlled and the corrugations therein may be accurately formed by the opposed rolls within the oven 34 the spacing of which may be adjusted and the journals for which are located without the oven 34 so that the chains may not be unduly affected by the temperature within the oven. The cooperation of the parts described and the steps of the process as they are associated with each other make possible the novel attainment of the continuous production of corrugated molded fiber glass reinforced polyester web and sheet.

It is to be understood that it is in accordance with the invention to use in place of the cellophane other material such as, for example, polyethylene, acetate, vinyl and cellulose acetate. Cellulose acetate has the peculiar property of wrinkling up under the influence of thermo treatment and imparting a wrinkle finish to the surface of the product and this finish is desirable for certain purposes.

While some of the description herein specifically refers to fiber glass reinforced polyester resin, it is to be understood that it is within the scope of the invention to use paper, cloth, felt, or other reinforcing material in place of the fiber glass and such thermosetting resins as silicones and "Epon" in place of the polyester resin.

It will be obvious to those skilled in the art that various changes may be made without departing from the spirit of the invention and, therefore, the invention is not limited to what is shown in the drawings and described in the specification, but only as indicated in the appended claims.

What is claimed is:

1. The process of continuously forming a reinforced resin product including forming the reinforcement, spraying resin thereon to facilitate handling, partially curing the resined reinforcement, continuously advancing the latter and substantially surrounding same with a resin retaining means, furnishing additional resin between the resined reinforcement and said last named means, exposing the entire assembly thus created to presetting conditions including initiating an exothermic reaction therein, then passing the assembly in slack condition through a station wherein the assembly is continuously shaped and becomes set, side trimming same upon its emergence from said station and delivering the trimmed product.

2. The process according to claim 1 in which the web is a relatively weak web and wherein the web in substantially slack condition longitudinally is smoothed horizontally and diagonally before being shaped and finally set by said exothermic reaction.

3. The process of continuously forming fiber reinforced resin comprising preparing said fiber and forming same into a relatively weak web, strengthening same by spraying resin thereon, exposing said treated web to a change in temperature, continuously moving said web toward a resin supply, providing the moving web with moving resin retaining means on at least two sides, metering resin to each side of the web and maintaining a puddle of resin of predetermined level against said web sides, forwarding the web and retaining means through a smoothing station in a relatively slack condition, shaping and finally setting said web in said shape with its retaining means in transit, trimming, automatically cutting and delivering the product.

4. Apparatus for continuously forming a reinforced resin product comprising a supply of reinforced web, a series of web conveyors therefor, means for supplying resin simultaneously to both sides of said web, a plurality of vertically travelling webs for maintaining the resin in contact with each face of said first named web, rotary means frictionally engaging, at an angle, more than one of said travelling webs for smoothing same said plurality of travelling webs, means for presetting said resin, means for imparting a predetermined shape to the travelling assembled webs, insulated means substantially surrounding said shaping means wherein the curing of the resin is completed, means for side trimming the reinforced resin product, means for cutting same into a predetermined length, other means for delivering same, said shaping means including cooperating sets of vertically resilient travelling rollers.

5. Apparatus according to claim 4 in which the means for pre-setting is located between the elements of the said rotary smoothing means, said smoothing means comprising spaced pairs of rollers located diagonally with respect to the path of travel of the web and in which the shaping means is driven and carried from outside said insulated means substantially surrounding the shaping means.

6. An apparatus for the continuous production of glass fiber reinforced corrugated plastic sheets, comprising means for supporting separate webs of a flexible, non-porous, non-adhesive material, a pair of horizontally positioned pressure rolls, means for guiding said non-porous webs partially around each of and in between said rolls, means for spreading a resin on the confronting surfaces of said webs of non-adhesive material for maintaining a supply of resin at the nip of said rolls, means for supporting a mat of glass fiber reinforcing material, rolls for feeding the mat vertically and downwardly between said webs of non-adhesive material and into said supply of resin, the mat of glass fibers being of lesser width than the web of non-porous material and being positioned centrally thereof, said rolls being so arranged as to compact and intimately impregnate said mat with said resin and to enclose it between said webs of non-adhesive material, two intermeshing endless corrugating belts comprising a series of transversely mounted rolls, means for directing the assembly of said mat of resin impregnated material so enclosed by said non-adhesive web material in between said two endless corrugating belts, a means for heating said chamber, said endless belts being located in said chamber and serving to convey said enclosed resin impregnated mat assembly through said chamber, whereby transverse corrugations are imparted to said enclosed resin impregnated mat while it is being conveyed through said heated chamber, while concurrently curing the resin contained therein, and means for subsequently side trimming the assembly.

7. An apparatus according to claim 6 including means for forming the mat of glass fiber reinforcing material as a relatively weak web, a series of means for continuously transporting same in relatively slack condition, a pre-setting station accommodating the impregnated mat enclosed between the webs of non-adhesive material located between the first pressure rolls and the chamber, the intermeshing endless corrugating belts comprising a series of transversely mounted rolls being located in the chamber, said chamber being independent of and surrounding said endless corrugating belts.

8. An apparatus according to claim 6 in which vertical means are provided at each end of and between the first horizontally positioned pressure rolls for damming the resin, and means for controlling the level of resin supplied to each side of the mat of glass fiber reinforcing material.

9. An apparatus according to claim 6 including rotary means for frictionally engaging, at an angle, said webs of non-adhesive material for smoothing same, said rotary means comprising at least one set of opposed resiliently surfaced rolls, following the emergence of the combined impregnated mat enclosed between said webs from the first horizontal pressure rolls.

10. A continuous process for the production of glass fiber reinforced corrugated plastic sheets, comprising concurrently feeding separate webs of a flexible, non-porous, non-adhesive material partially around each of and in between a pair of horizontally positioned pressure rolls, spreading a polyester resin on the confronting surfaces of said webs of non-adhesive material for maintaining a supply of resin at the nip of said rolls, continuously feeding a mat of glass fiber reinforcing material vertically and downwardly between said webs of non-adhesive material and into said supply of resin, the mat of glass fibers being of lesser width than the web of non-porous material and being positioned centrally thereof, compacting and intimately impregnating said mat with the resin as it is enclosed between the webs of non-adhesive material during movement between said rolls, feeding the assembly of said mat of resin impregnated material enclosed by said non-adhesive web material in between two endless corrugating belts, said endless belts being located in a heated chamber and serving to convey said enclosed resin impregnated mat assembly through said chamber, imparting transverse corrugations to said enclosed resin impregnated mat while it is being conveyed through said heated chamber and concurrently curing the resin contained therein, and subsequently side trimming the assembly.

References Cited in the file of this patent
UNITED STATES PATENTS

| | | |
|---|---|---|
| 1,195,408 | Smith | Aug. 22, 1916 |
| 2,496,911 | Green | Feb. 7, 1950 |
| 2,526,945 | Gray | Oct. 24, 1950 |
| 2,547,880 | Meyer et al. | Apr. 3, 1951 |
| 2,623,266 | Hemmi | Dec. 30, 1952 |
| 2,631,955 | Muskat | Mar. 17, 1953 |
| 2,663,351 | Osborne et al. | Dec. 22, 1953 |
| 2,695,652 | Segil | Nov. 30, 1954 |